United States Patent
Katakura et al.

(10) Patent No.: US 6,722,945 B2
(45) Date of Patent: Apr. 20, 2004

(54) ENDFACE POLISHING METHOD AND ENDFACE POLISHING APPARATUS

(75) Inventors: Kazumasa Katakura, Chiba (JP); Kouji Minami, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/261,636

(22) Filed: Sep. 30, 2002

(65) Prior Publication Data

US 2003/0073379 A1 Apr. 17, 2003

(30) Foreign Application Priority Data

Oct. 4, 2001 (JP) ............................ 2001-308567

(51) Int. Cl.[7] ............................................. B24B 1/00
(52) U.S. Cl. ................. 451/6; 451/5; 451/41; 451/289; 451/390; 451/10; 451/11
(58) Field of Search ........................... 451/6, 285–289, 451/41, 389–390, 5, 8, 9, 10, 11, 397

(56) References Cited

U.S. PATENT DOCUMENTS

| | | | | |
|---|---|---|---|---|
| 5,667,424 A | * | 9/1997 | Pan | 451/6 |
| 5,727,989 A | * | 3/1998 | Ohno et al. | 451/41 |
| 5,743,787 A | * | 4/1998 | Ishiyama et al. | |
| 6,126,519 A | * | 10/2000 | Minami et al. | 451/41 |
| 6,165,055 A | * | 12/2000 | Takahashi et al. | 451/287 |
| 6,309,278 B1 | * | 10/2001 | Suzuki et al. | 451/41 |
| 6,450,859 B1 | * | 9/2002 | Moyer | 451/5 |
| 6,488,567 B1 | * | 12/2002 | Flanders et al. | 451/6 |

* cited by examiner

*Primary Examiner*—George Nguyen
(74) *Attorney, Agent, or Firm*—Adams & Wilks (57) ABSTRACT

The invention is an endface polishing method and an endface polishing apparatus improving polishing accuracy of an optical fiber and making polishing time and polishing work shorten. Polishing is performed making a boundary line center axis while observing the boundary line of brightness and darkness formed at outer circumference face of an optical fiber by irradiating substantial parallel light from the predetermined direction crossing at the right angle to the axis of the optical fiber in an endface polishing method polishing a tip end of the optical fiber held by a jig by a polishing member attached at a polishing disk in an apparatus providing the polishing disk supported by a main body of the apparatus and the jig holding the optical fiber.

10 Claims, 6 Drawing Sheets

ENDFACE POLISHING METHOD AND ENDFACE POLISHING APPARATUS

BACKGROUND OF THE INVENTION

The present invention relates to an endface polishing method for polishing a tip endface of an optical fiber used for optical interconnection and the like.

Up to now, in the case of connecting facing optical fibers to each other, optical interconnection of a pair of optical fibers is performed by an apparatus having a semiconductor laser provided at a tip end side of one optical fiber and irradiating light from the optical fiber and a pair of optical systems for making the light from the semiconductor laser parallel and converging in the other optical fiber.

In such apparatus, the semiconductor laser and the optical systems must be arranged for the pair of optical fibers with high accuracy so that there is a problem that insertion loss and the like become large when the arranged position is inaccurate.

Because of that, a method is proposed, in which a tip end of the optical fiber is polished in a wedge shape without arranging the semiconductor laser at the tip end of the one optical fiber and light similar as the light from the semiconductor laser is irradiated from the tip endface.

Figure 6:
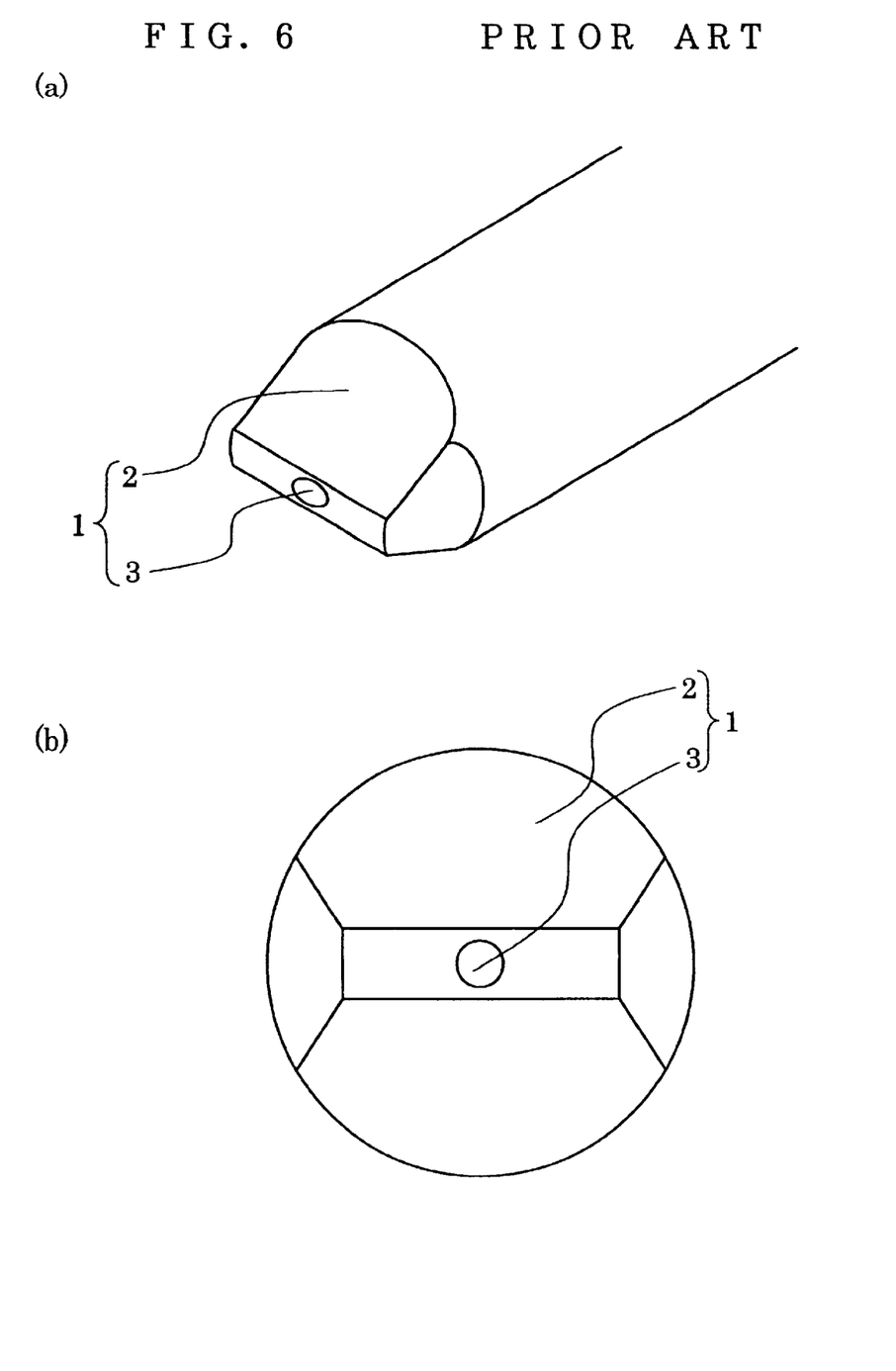
FIG. 6 are a perspective view and a plane view from an endface side of an optical fiber according to the prior art.

Here, the optical fiber having the wedge shape at the tip end will be described. FIG. 6 are a perspective view and a plane view from the endface direction of the optical fiber.

As shown in the figure, an optical fiber 1 has a cladding 2 and a core 3 provided at the center of the optical fiber, and the cladding 2 is formed in wedge shape. Further, the tip endface where the core 3 is provided is formed so as to project in curved shape.

In the case using such the optical fiber 1 having the wedge shape at the tip end, it is needless to perform positioning of arranging the semiconductor laser so that assembling process is simplified.

However, since eccentricity of the core in such the optical fiber must be less than 0.5 µm, accuracy of polishing has been confirmed by detaching the optical fiber from a polishing apparatus after polishing some degree by the polishing apparatus in polishing the tip end of the optical fiber. Because of that, there is a problem that positioning of polishing is difficult even if the optical fiber is polished attaching at the polishing apparatus again and polishing accuracy becomes bad by dispersion of attaching position.

Further there is a problem that yield is bad because a scar generates at the optical fiber or the optical fiber is broken by detaching the optical fiber often.

Furthermore, there is a problem that polishing time and polishing work become long by confirming polishing accuracy repeating attaching and detaching.

SUMMARY OF THE INVENTION

A first mode of the invention to solve the above problem is in an endface polishing method polishing a tip end of an optical fiber held by a jig by a polishing member attached at a polishing disk in an apparatus providing the polishing disk supported by a main body of the apparatus and the jig holding the optical fiber, wherein polishing is performed making a boundary line center axis while observing the boundary line of brightness and darkness formed at outer circumference face of the optical fiber by irradiating substantial parallel light from the predetermined direction crossing at the right angle to the axis of the optical fiber.

A second mode of the invention is in an endface polishing method wherein the boundary line is observed at outer circumference crossing at the right angle to irradiation direction of the parallel light of the optical fiber by observing from direction crossing at the right angle to a face including the predetermined direction in the first mode.

A third mode of the invention is in an endface polishing method wherein the boundary line where light is converged at outer circumference face of the opposite side to irradiating direction of the parallel light of the optical fiber permeating the optical fiber is observed by observing from the opposite side to the predetermined direction in the first mode.

A fourth mode of the invention is in an endface polishing method wherein a core of the optical fiber is projected to axis direction and the boundary line is formed at outer circumference of the core by etching the tip end portion of the optical fiber in any mode of the first to third modes.

A fifth mode of the invention is in an endface polishing method wherein the tip end of the optical fiber is polished in wedge shape or convex spherical surface in any mode of the first to fourth modes.

A sixth mode of the invention is in an endface polishing method wherein polishing by the polishing member is a dry polishing without using polishing abrasive liquid in any mode of the first to fifth modes.

A seventh mode of the invention is in an endface polishing method wherein the polishing is performed by a wet polishing and the abrasive liquid of the endface is removed at the observation in any of the first to fifth endface polishing methods.

A eighth mode of the invention is in an endface polishing method wherein removing of the abrasive liquid is performed by air blow in the seventh polishing method.

A ninth mode of the invention is in an endface polishing method wherein an irradiating unit irradiating the substantial parallel light to direction crossing at the right angle to the axis of the optical fiber is moved when the jig holding the optical fiber is moved in the first mode.

In such the invention, the boundary line of brightness and darkness is formed at outer circumference face of the optical fiber by irradiating substantial parallel light, and by polishing making the boundary line the center axis, it is needless to repeat attaching and detaching because of confirmation of polishing state so as to polish with high accuracy.

A tenth mode of the invention is in an endface polishing apparatus comprising a main body provided rotatably and having a polishing disk holding a polishing member, a jig holding an optical fiber and touching the tip end thereof to the polishing member, a supporting mechanism supporting the jig movably to direction of the polishing disk, and an irradiating unit irradiating substantial parallel light to the optical fiber.

DETAILED DESCRIPTION OF THE PREFERRED EMBODIMENTS

The invention will be described below in detail based on embodiments.

(Embodiment 1)

Figure 1:
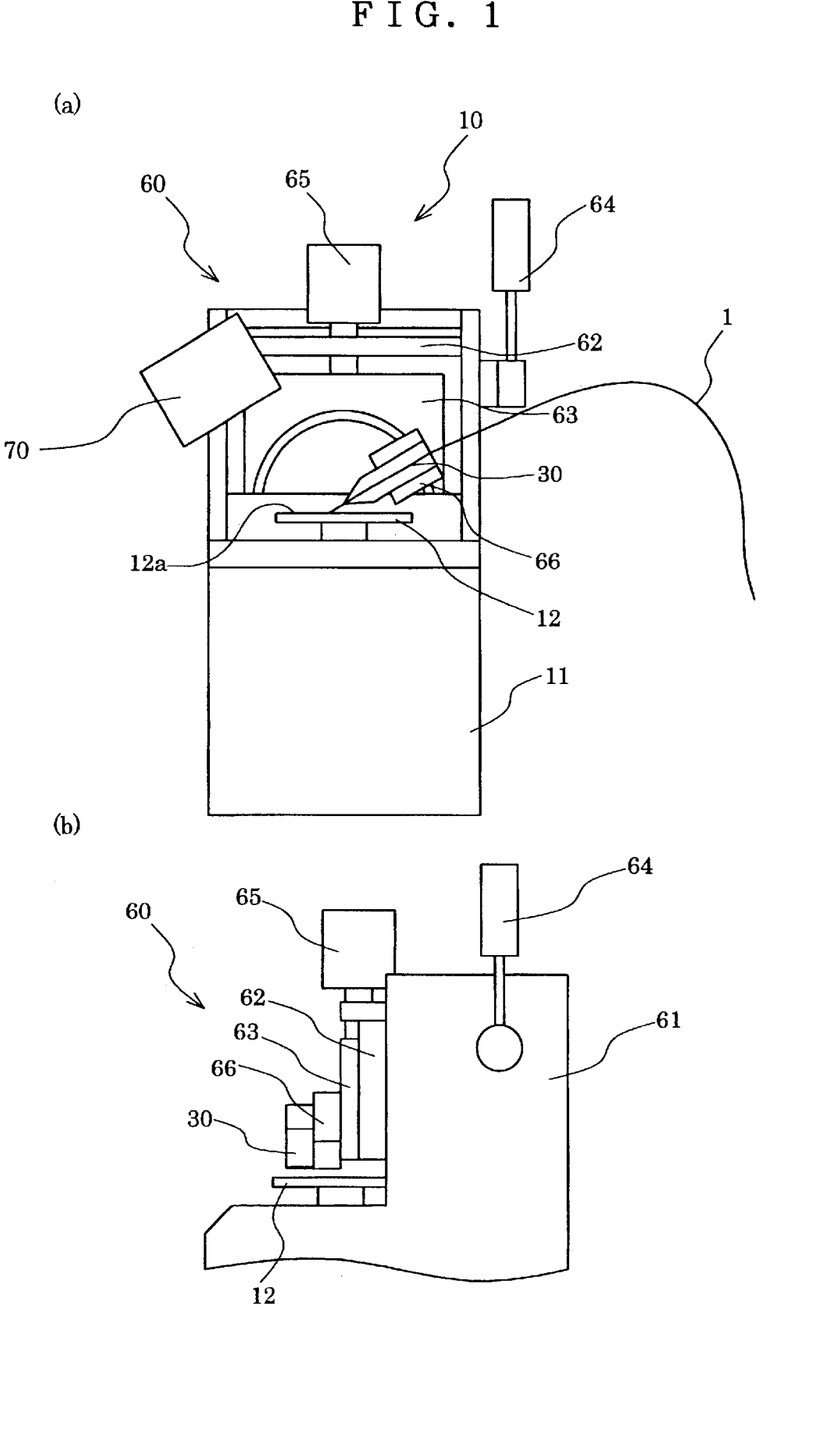
FIG. 1 are a front view and a side view of an endface polishing apparatus according to Embodiment 1 of the invention.
Figure 2:
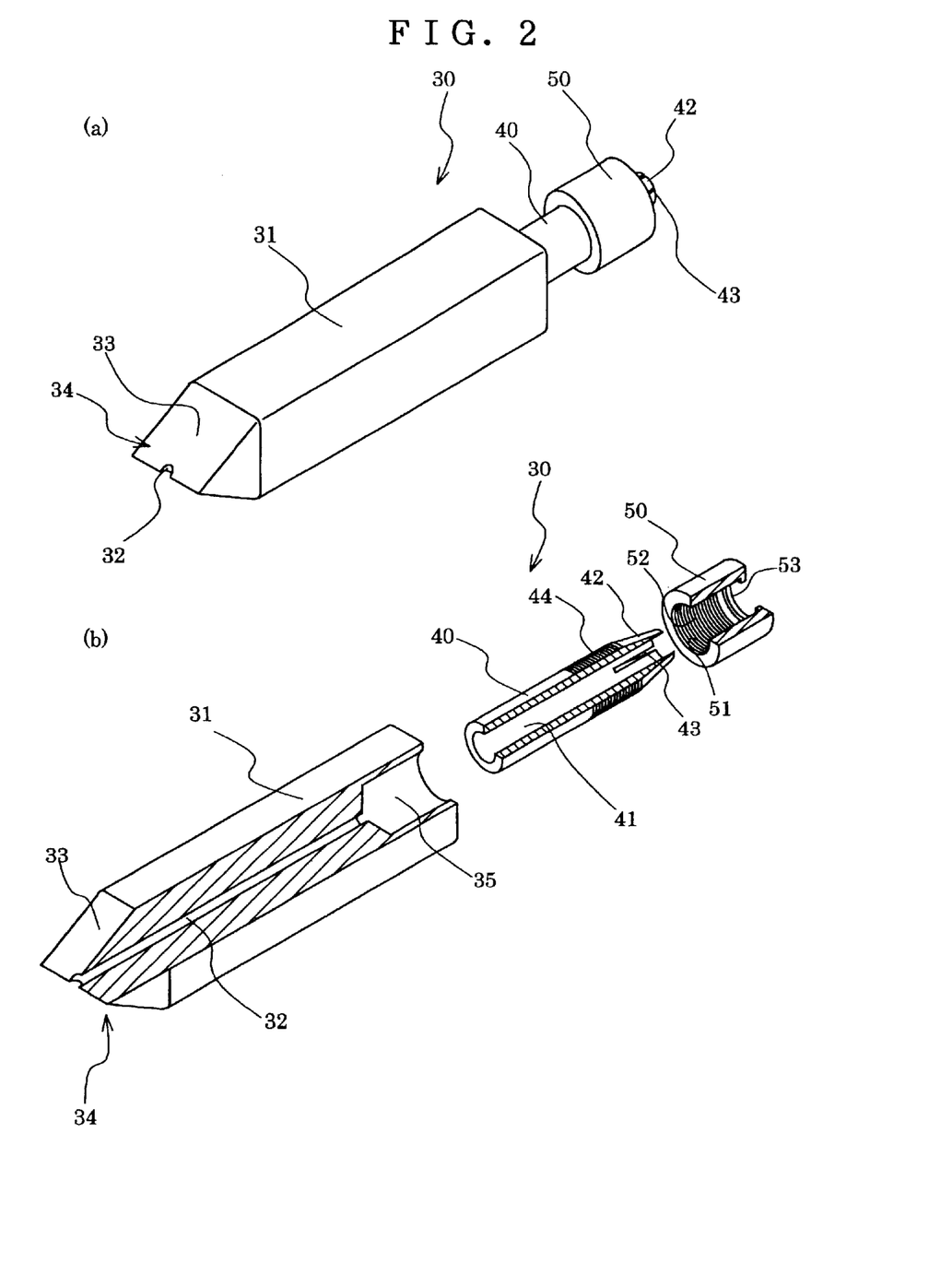
FIG. 2 are a perspective view of a jig and a disassembled perspective view cutting a part thereof according to Embodiment 1 of the invention.

FIG. 1 are a front view and a side view of an endface polishing apparatus according to Embodiment 1 of the invention; and FIG. 2 are a perspective view of a jig and a disassembled perspective view cutting a part thereof according to Embodiment 1 of the invention.

As shown in the figures, an endface polishing apparatus 10 of the invention has a main body 11 having a polishing disk 12 provided rotatably and reciprocatably and holding a polishing member 12a, a jig 30 holding an optical fiber 1, a supporting mechanism 60 supporting the jig 30 movably relative to the polishing disk 12, and an irradiating unit 70 irradiating substantial parallel light to the optical fiber 1.

The jig 30 is not limited as far as the optical fiber 1 is held and the tip end thereof is touched to the polishing member 12a held by the polishing disk 12. However in the embodiment, the jig has a jig main body 31 of quadrangular prism shape, a holding member 40 provided at rear end portion of the jig main body 31 and inserting to hold a coated optical fiber, and a fastening member 50 provided at outer circumference of the holding member 40 as shown in FIG. 2.

The main body of the jig 31 has quadrangular prism shape, and an optical fiber inserting hole 32 inserting to hold the optical fiber 1 at almost center to longitudinal direction is provided.

At the tip end portion of the main body of the jig 31, the optical fiber inserting hole 32 is provided in wedge shape so as to open at the tip end.

Here, the optical fiber 1 composed of glass or plastic for example, and the polishing member 12a composed of a polishing grindstone and the like is made of cerium oxide, silica, zirconia and so on for example. The tip end portion of the main body of the jig 31, at least, is formed by material not polished even at touching to the polishing member, for example, zirconia or alumina.

At a base end portion side of the jig main body 31, the holding member 40 inserting to hold the coated optical fiber covering at outer circumference of the optical fiber 1 is provided.

The holding member 40 has cylindrical shape having a coated optical fiber inserting hole 41 enabling to insert the coated optical fiber in the axis direction, and the fastening member 50 is screwed at outer circumference of the base end portion side.

By that the tip end portion of the holding member 40 is fitted to a fitting hole 35 being provided at the base end portion side of the main body of the jig 31 and having larger inner diameter than inner diameter of the optical fiber inserting hole 32, the optical fiber inserting hole 32 and coated optical fiber inserting hole 41 are fixed at the connecting state.

The base end portion side of the holding member 40 is a shrinking portion 42 of taper shape reducing diameter to the end portion, and plural notch portions 43 are provided in the axis direction at the shrinking portion 42.

The holding member 40 holds the coated optical fiber by the shrinking portion 42 providing the notch portions 43 are deformed elastically to the coated optical fiber inserting hole 41 side. The holding member 40 is not limited especially as far as the shrinking portion 42 is made of material enabling to hold the coated optical fiber by elastic deformation of the shrinking portion 42.

A male screw 44 fitting with the fastening member 50 is cut at outer circumference of the base end portion side of the holding member 40.

Here, the fastening member 50 has inner diameter almost similar as outer circumference of the base end portion side of the holding member 40 and has cylinder shape having a through hole 52 where a female screw 51 fitting with the male screw 44 of the holding member 40 is cut at inner face, and a pressing portion 53 having smaller inner diameter than inner diameter of the through hole 52 at one end of the through hole 52.

By screwing the fastening member 50 to outer circumference of the holding member 40, the pressing portion 53 touches outer face of the shrinking portion 42 of the holding member 40 so as to hold the coated optical fiber by deforming the shrinking portion 42 elastically to the coated optical fiber inserting hole 41 side.

In the jig 30, the optical fiber 1 can be polished with high accuracy by slidably touching the tip end of the optical fiber 1 to the polishing member 12a.

A supporting mechanism 60 holding such the jig 30 will be described.

The supporting mechanism 60 having a supporting portion 61 extended at a position facing the polishing disk 12 is provided at the main body 11 of the apparatus 10, which is composed of a rapid carriage table 62 provided movably at the supporting portion 61 to the direction of the polishing disk 12 and a fine carriage table 63 held by the rapid carriage table 62, and in which the jig 30 is provided rotatably to direction of radius of the optical fiber 1 as shown in FIG. 1.

The rapid carriage table 62 can be moved coarsely to the polishing disk 12 side by a rapid carriage handle 64 provided the supporting portion 61.

The fine carriage table 63 is held movably in the up and down direction of the polishing disk 12 to the rapid carriage table 62, and can be moved slightly to the polishing disk 12 side by an adjusting unit 65 composed of a micrometer head and the like provided at the rapid carriage table 62.

At the fine carriage table 63, a rotating member 66 fixing the side face of the jig 30 is provided. The rotating member 66 is provided for rotating to move the jig 30 to radius direction of the optical fiber 1 to the polishing disk 12. Thus, since wedge shape composed of two faces is formed at the tip end of the optical fiber 1 held by the jig 30, the rotating member can be moved so that each face of the wedge shape faces the polishing member 12a each other.

Such the fine carriage table 63 is pressed to the polishing disk 12 side by the adjusting unit 65, and the tip end of the optical fiber 1 is pressed to the polishing disk 12 with the predetermined pressure so as to polish the tip end of the optical fiber 1.

Since coarse movement and fine movement of the jig 30 can be performed easily by these rapid carriage table 62 and the fine carriage table 63, positioning and movement of the jig 30 can be performed in short time and fine adjustment of pressure pressing the tip end of the optical fiber 1 to the polishing disk 12 can be performed easily.

On the other hand, an irradiating unit 70 forms a boundary line at outer circumference face of the optical fiber 1 by brightness and darkness of light by irradiating substantial parallel light from the predetermined direction crossing at the right angle with the axis of the optical fiber 1.

In detail, when parallel light is irradiated to the optical fiber 1 from one direction, the boundary line of bright area and shade area of light is formed to the direction crossing at the right angle to irradiating direction of outer circumference face of the optical fiber 1. Since the boundary line formed by such the way can be observed as a center axis of the optical fiber 1 because the optical fiber 1 is formed with high accurate right circle.

Observing direction is desirable to be direction crossing at the right angle to irradiating direction of parallel light in order to make positioning accuracy high at polishing as a center axis of the optical fiber 1 for the boundary line.

At observation of the boundary line provided at the outer circumferential face of the optical fiber 1, observation by use of the eyes is difficult because the optical fiber 1 itself is thin. Because of that, the optical fiber 1 can be polished with high accuracy by observing the exact position of the boundary line by providing an image sensor for obtaining an image picture of the tip end portion of the optical fiber 1 providing the boundary line and a display device for displaying the obtained image picture by the image sensor so as to enlarge the display of the boundary line.

Further although the jig 30 is moved at polishing the optical fiber 1, it is necessary that parallel light by the irradiating unit 70 is always irradiated from direction crossing at the right angle to axis direction of the optical fiber 1. Because of that, plural irradiating units 70 may be provided or the irradiating unit 70 may be rotated to move with the jig.

Figure 3:
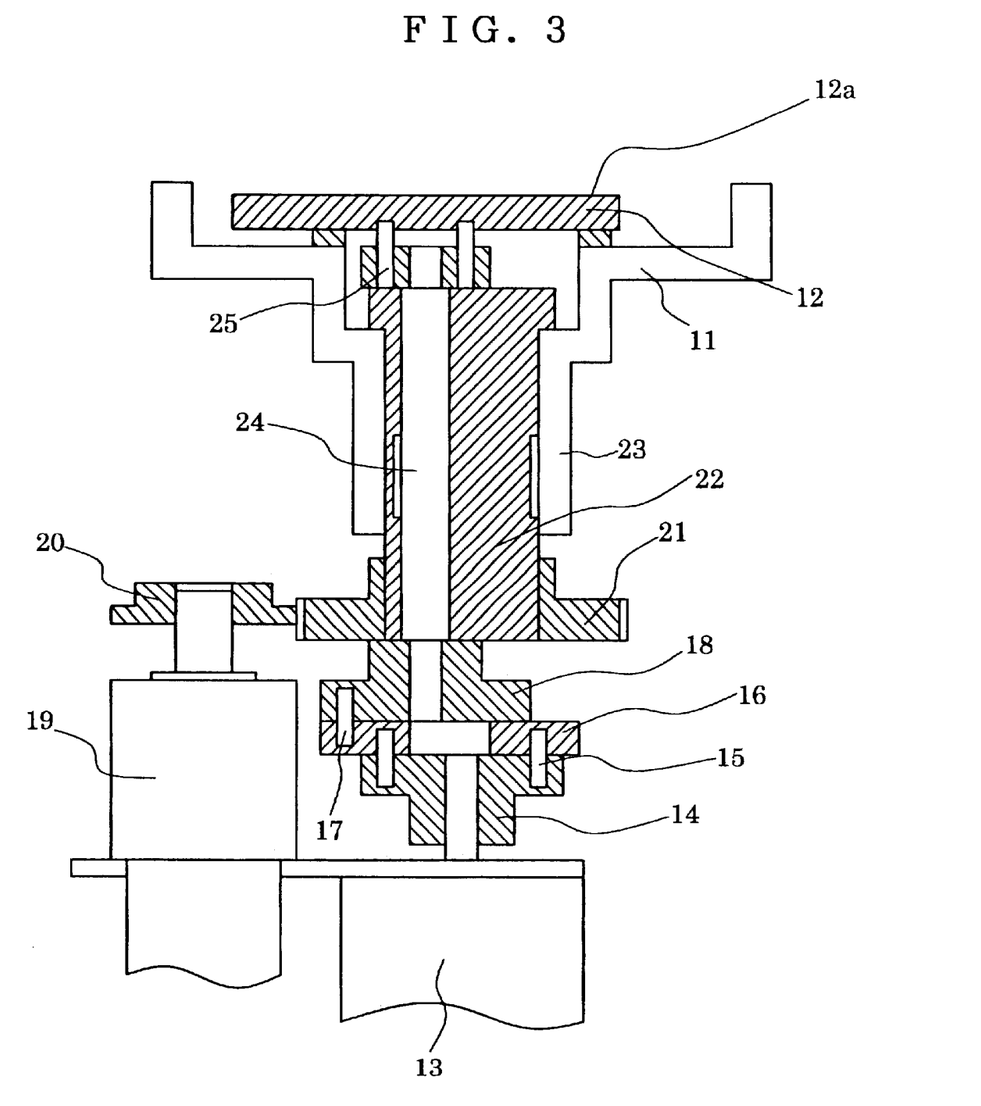
FIG. 3 is a sectional view showing a driving system of an endface polishing apparatus according to Embodiment 1 of the invention.

Here, an example of driving system of such the endface polishing apparatus will be described. FIG. 3 is a sectional view of the main part of the endface polishing apparatus according to Embodiment 1.

A center portion of a first rotation transmission disk 14 is fixed at rotation shaft of a rotation motor 13, and plural first connecting pins 15 are fixed on a concentric circle making center of rotation fulcrum at the first rotation transmission disk 14 as shown in FIG. 3. Each of the first connecting pins 15 is connected to an eccentric portion of each of corresponding rotation transmission disks 16, and a second connecting pin 17 is fixed at an eccentric portion of each rotation transmission disk 16. Each of second connecting pins 17 is connected to a second rotation transmission disk 18 rotatably.

On the other hand, a center portion of a driving gear 20 is fixed at a rotation shaft of a revolution motor 19, and a driven gear 21 is engaged with the driving gear 20. The driven gear 21 is fixed at outer circumference of lower portion of a revolution transmission shaft 22, and a bearing cylinder portion 23 of the main body of the apparatus 11 is fitted at outer circumference of upper portion of the revolution transmission shaft 22. A rotation-rotating shaft 24 is inserted rotatably at eccentric position with the predetermined quantity from center of rotation of the revolution transmission shaft 22, and the lower end portion of the rotation-rotating shaft 24 is fixed at center portion of the second rotation transmission disk 18.

The upper end portion of the rotation-rotating shaft 24 is connected to the polishing disk 12 through a connecting member 25, further at the upper face portion of the polishing disk 12, the polishing member 12*a* of a polishing sheet or the like is attached.

In such the endface polishing apparatus, first about revolution movement, the revolution transmission shaft 22 is rotated through gears 20 and 21 by driving the revolution motor 19 so that the polishing disk 12 performs revolution movement the predetermined eccentric quantity as shown in FIG. 3. Although there is the rotation-rotating shaft 24 at the revolution transmission shaft 22 in this case, each of the rotating transmission disks 16 rotates around the first connecting pin 15 with the same phase as rotation of the revolution transmission shaft 22 since plural rotating transmission disks 16 are arranged between the first rotation transmission disk 14 and the polishing disk. Therefore, rotation of the revolution transmission shaft 22 is not controlled if the first rotation transmission disk 14 stops or rotates.

On the other hand, although driving the rotation motor 13 rotates the first rotation transmission disk 14 about rotation movement, the first connecting pin 15 is on the first rotation transmission disk 14. Therefore, although the first connecting pin follows the same tracks as the above-mentioned and the rotation-rotating shaft 24 is eccentric the predetermined quality, rotation of the same rotation number as the first rotation transmission disk 14 is transmitted to the rotation-rotating shaft 24 since the rotation-rotating shaft is connected through the rotation transmission disk 16.

Thus, the polishing disk 12 revolves while rotating by rotation movement of the revolution transmission shaft 22 and the rotation-rotating shaft 24.

On the other hand, the jig 30 fixing an optical multi-fiber of the embodiment to the polishing disk 12 is moved to direction of the polishing disk 12 by the supporting mechanism 60 so as to press the endface of the optical fiber to the polishing disk 12. Thus, the tip end of the optical fiber can be polished with high accuracy.

Figure 4:
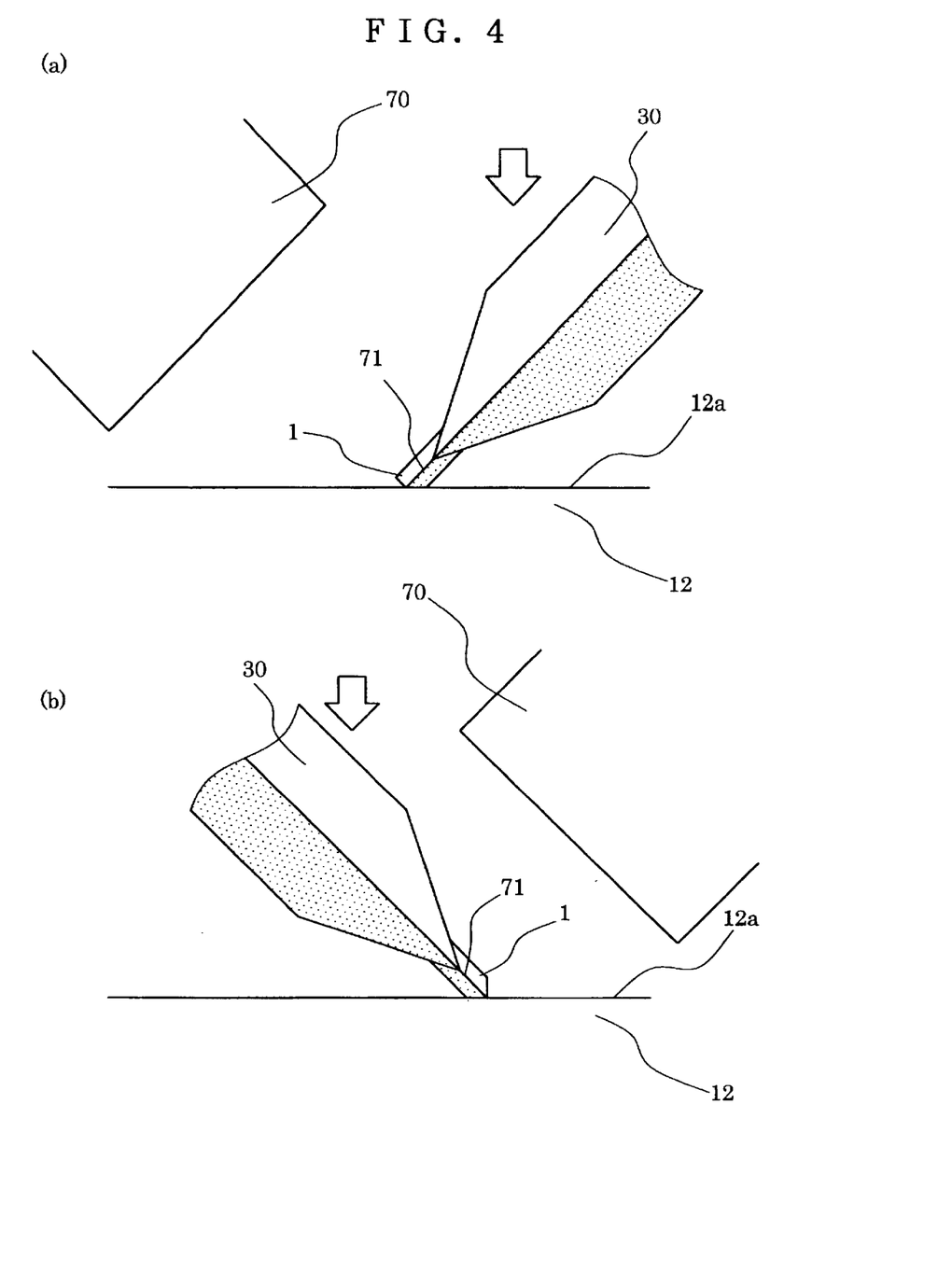
FIG. 4 are views enlarging main parts showing an endface polishing method of an optical fiber according to Embodiment 1 of the invention.

Here, a polishing method polishing the tip end of the optical fiber by such the endface polishing apparatus will be described in detail. FIG. 4 are enlarged views of a main part showing an endface polishing method of the optical fiber.

First, one face of the wedge shape is formed at the tip end of the optical fiber 1 by polishing as shown in FIG. 4A.

In detail, touching the polishing disk 12 polishes the optical fiber moving the jig 30 fixing the optical fiber 1 by the supporting mechanism 60.

At this time, by irradiating parallel light to the optical fiber 1 by the irradiating unit 70 and forming a boundary line 71 of bright and darkness being a center axis of outer circumference face of the optical fiber, polishing is performed standardizing the boundary line 71. Because of that, the one face of the wedge shape is formed at the tip end of the optical fiber 1 with high accuracy.

Next, the other face of the wedge shape is formed at the tip endface of the optical fiber 1 by rotating the jig 30 as shown in FIG. 4B.

Similarly as the above-mentioned polishing of the one face even at this time, by irradiating parallel light to the optical fiber 1 by the irradiating unit 70 and forming a boundary line 71 of bright and darkness being a center axis of outer circumference face of the optical fiber 1, polishing is performed standardizing the boundary line 71. Because of that, the other face of the wedge shape is formed at the tip end of the optical fiber 1 with high accuracy. Because of that, the optical fiber 1 of wedge shape described in the prior art can be formed.

Thus, since the boundary line 71 of brightness and darkness is formed at outer circumference face of the optical fiber 1 so as to perform polishing work making the boundary line 71 at the center axis, the tip end of the optical fiber 1 is formed in wedge shape and with high accuracy without detaching the optical fiber 1 from the jig 30 during a series of polishing processes. Because of that, divergence of accuracy caused by repeated attaching adn detaching, and scarring and the like at the polished face are prevented so as to polish with high accuracy, and polishing process is simplified so as to shorten polishing time.

(Embodiment 2)

Although the boundary line 70 is formed to direction crossing at the right angle to irradiating direction of outer circumference face of the optical fiber 1 irradiating parallel light to the optical fiber 1 by the irradiating unit 70 in Embodiment 1, Embodiment 2 is an example that parallel light by the irradiating unit and area observing the boundary line are changed.

Figure 5:
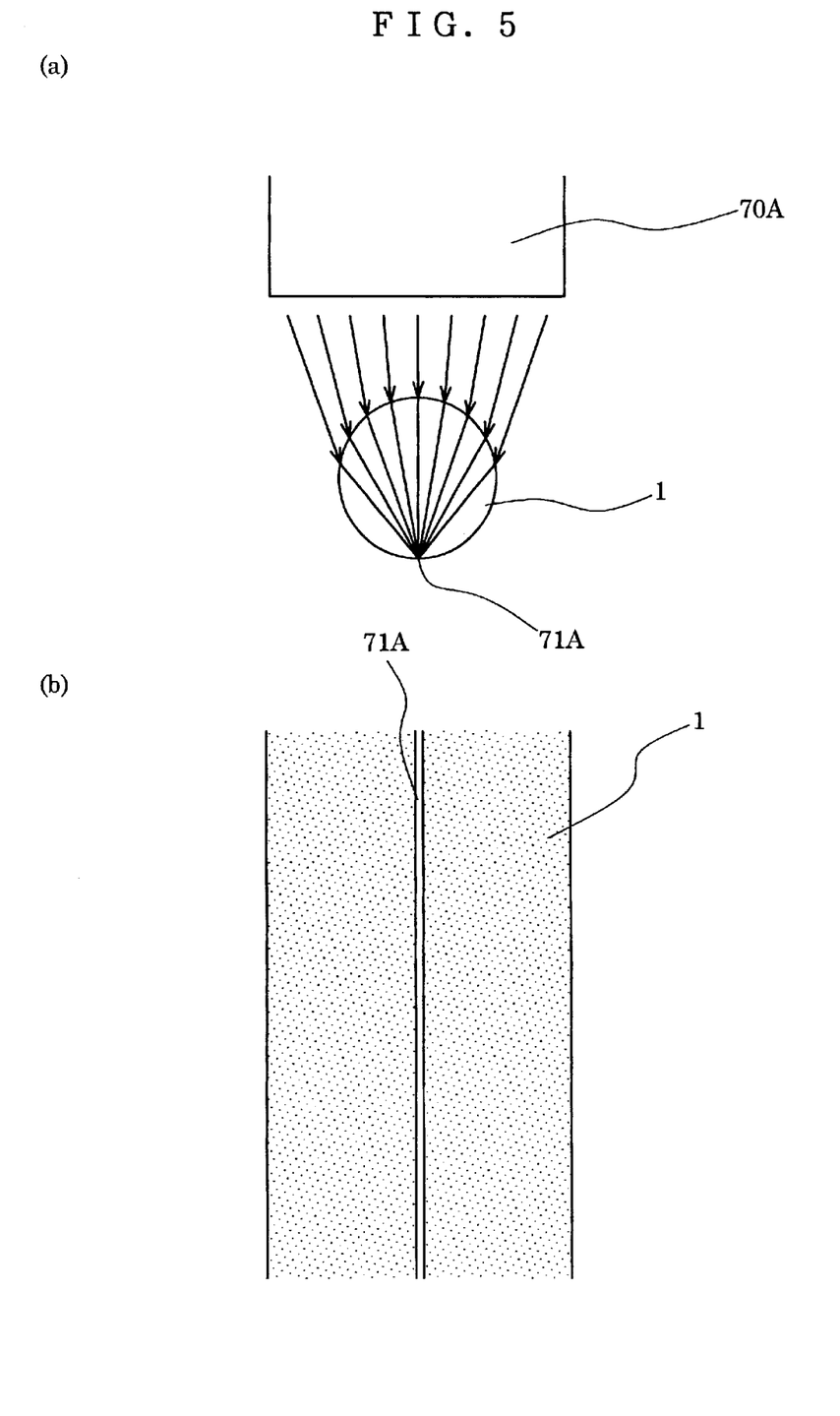
FIG. 5 are views enlarging main parts showing a polishing method of an optical fiber according to Embodiment 2 of the invention.

FIG. 5 are enlarged views of main parts showing a polishing method of the optical fiber.

An irradiating unit 70A of the embodiment irradiates from direction crossing at the right angle to the axis of the optical fiber 1 and a boundary line 71A is formed at the opposite face of the face where parallel light of outer circumference face of the optical fiber is irradiated by converging the irradiated light in the optical fiber as shown in FIG. 5.

That is, the irradiating unit 70A irradiates parallel light so as to form the boundary line 71A by converging parallel light to the face of the opposite side in the optical fiber In the boundary line 71A formed such the way, the optical fiber can be polished as the center axis of the optical fiber 1 observing from the opposite face to the face irradiating parallel light.

Thus, since even the boundary line 71A formed at outer circumference face of the optical fiber 1 can function as a center axis, polishing work can be performed with high accuracy standardizing the boundary line 71A, and polishing time can be shortened similarly as the above-mentioned Embodiment 1.

Although the boundary line 71A is made by converging the parallel light irradiated by the irradiating unit 70A to the center axis of outer circumference face of the optical fiber in the embodiment, for example, irradiating direction of the parallel light may be set so that position of the converging boundary line shifts the desired quantity without limiting to this.

(Another Embodiment)

Although Embodiment 1 and Embodiment 2 are described above, endface polishing method is not limited to the above.

The endface polishing method performing polishing working so as to make the tip end of the optical fiber wedge shape is shown as an example in the above Embodiment 1 and Embodiment 2. However, highly accurate polishing work can be performed by providing the boundary line 71 or 71A being the center axis at outer circumference face of the optical fiber even if the tip end of the optical fiber 1 is any shape without limiting especially to convex spherical surface shape and the like for example.

Polishing is performed standardizing the center axis making the boundary line 71 or 71A formed at outer circumference face of the cladding 2 the center axis in the above Embodiment 1 and Embodiment 2. However, polishing may be performed standardizing the center axis making the boundary line 71 or 71A formed at outer circumference of the core 3 the center axis projecting the core 3 the predetermined quantity by etching the tip end of the optical fiber before polishing working without limiting to this.

Further, although the rotation-rotating shaft 24 is provided at the eccentric position with the predetermined quantity in the revolution transmission shaft 22 as a driving system of the endface polishing apparatus 10 in the above Embodiment 1 and Embodiment 2, for example, the endface polishing apparatus may be an apparatus arranging a revolution transmission shaft in a rotation-rotating shaft without limiting especially to this.

As described above, according to the endface polishing method of the invention, the boundary line of brightness and darkness is formed at outer circumference face of the optical fiber by irradiating substantial parallel light from direction crossing at the right angle to axis direction of the optical fiber, and polishing work can be shortened improving polishing accuracy by performing polishing work of the optical fiber making the boundary line the center axis. It is prevented surely that the tip end portion of the optical fiber has scar and the optical fiber itself breaks by repeating attaching and detaching because confirmation of polishing state of the optical fiber can be performed without detaching from the jig.

What is claimed is:

1. An endface polishing method for polishing a tip end of an optical fiber held by a jig by a polishing member attached at a polishing disk in an apparatus providing the polishing disk supported by a main body of the apparatus and the jig holding the optical fiber, comprising the steps of:

irradiating substantially parallel light in a predetermined direction crossing at the a right angle to an axis of the optical fiber to observe a boundary line of brightness and darkness formed at an outer circumference face of the optical fiber; and polishing the tip end of an optical fiber by using the boundary line as a center axis.

2. An endface polishing method according to claim 1, wherein the boundary line is observed at the outer circumference of the optical fiber, crossing at the right angle to the irradiating direction of the parallel light, by observing from a direction crossing at the right angle to a face including the predetermined direction.

3. An endface polishing method according to claim 1, wherein the boundary line where light is converged at the outer circumference face of the opposite side to the irradiating direction of the parallel light of the optical fiber permeating the optical fiber is observed by observing from the opposite side to the predetermined direction.

4. An endface polishing method according to any of claim 1 to claim 3, wherein a core of the optical fiber is projected to the axis direction and the boundary line is formed at an outer circumference of the core by etching the tip end portion of the optical fiber.

5. An endface polishing method according to claim 1, wherein the tip end of the optical fiber is polished in a wedge shape or a convex spherical shape.

6. An endface polishing method according to claim 1, wherein polishing by the polishing member is a dry polishing without using polishing abrasive liquid.

7. An endface polishing method according to claim 1, wherein the polishing is performed by a wet polishing and the abrasive liquid of the endface is removed at the observation.

8. An endface polishing method according to claim 7, wherein removing of the abrasive liquid is performed by air blowing.

9. An endface polishing method according to claim 1, wherein an irradiating unit for irradiating the substantially parallel light in a direction crossing at the right angle to the axis of the optical fiber is moved when the jig holding the optical fiber is moved.

10. An endface polishing apparatus comprising: a main body provided rotatably and having a polishing disk holding a polishing member, a jig holding an optical fiber and touching the tip end thereof to the polishing member, a supporting mechanism supporting the jig movably with respect to the polishing disk, and an irradiating unit for irradiating substantially parallel light to the optical fiber.

* * * * *